US012809776B2

(12) United States Patent
Murali et al.

(10) Patent No.: US 12,809,776 B2
(45) Date of Patent: Nov. 24, 2026

(54) PRIORITY-BASED RESTORATION OF OFFLOADED DATA BACK INTO NON-PERSISTENT MEMORY IN A PROCESSOR-BASED SYSTEM TO REDUCE ACCESS MISSES

(71) Applicant: QUALCOMM Incorporated, San Diego, CA (US)

(72) Inventors: Naveen Murali, Erode (IN); Subham Panda, Balasore (IN); Radhakrishna Mugada, Hyderabad (IN); Sri Ananda Sai Jannabhatla, Hyderabad (IN); Dinesh Nagjibhai Sudani, Amreli (IN); Jyothi Ramidi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/053,908

(22) Filed: Feb. 14, 2025

(65) Prior Publication Data

US 2026/0244570 A1 Aug. 20, 2026

(51) Int. Cl.
*G06F 12/00* (2006.01)
*G06F 3/06* (2006.01)
*G06F 12/0802* (2016.01)

(52) U.S. Cl.
CPC ................................ *G06F 12/0802* (2013.01)

(58) Field of Classification Search
CPC .......... G06F 12/0607; G06F 3/00; G06F 7/00; G06F 2115/00; G06F 2123/00; G06F 2205/00; G06F 2207/00; G06F 2209/00; G06F 2211/00; G06F 2218/00
See application file for complete search history.

(56) References Cited

U.S. PATENT DOCUMENTS

2002/0087816 A1* 7/2002 Atkinson ................ G06F 12/08 711/158
2014/0189334 A1* 7/2014 Cheng ................... G06F 9/4418 713/1
2022/0129527 A1* 4/2022 Dunn .................... G06F 1/3203

* cited by examiner

*Primary Examiner* — Yong J Choe
(74) *Attorney, Agent, or Firm* — WITHROW & TERRANOVA, PLLC

(57) ABSTRACT

Priority-based restoration of offloaded data back into cache memory in a processor-based system to reduce access misses is disclosed. The processor-based system is configured to offload data from areas of cache memory designated as collapsible, into system memory in response to entering a lower power mode. The processor-based system determines a priority ordering of the offloaded data based on a prediction of its access demand by a processor after exiting the lower power mode. In this manner, when exiting the lower power mode, the processor-based system can restore offloaded data from system memory back into cache memory in such priority ordering. In this manner, the processor can be permitted to perform memory accesses to cache memory before the offloaded data is fully restored as access misses are less likely to occur by restoring data in order of more likely to be accessed sooner after exiting the lower power mode.

19 Claims, 8 Drawing Sheets

PRIORITY-BASED RESTORATION OF OFFLOADED DATA BACK INTO NON-PERSISTENT MEMORY IN A PROCESSOR-BASED SYSTEM TO REDUCE ACCESS MISSES

FIELD OF THE DISCLOSURE

The field of the disclosure relates to memory systems provided in a processor-based system, and more particularly to minimizing cache misses to cache memory in a memory system in a processor-based system.

BACKGROUND

Central processing units (CPUs), also known as microprocessors, perform computational tasks in a wide variety of applications. The CPU is typically provided in a processor-based system that includes other components, such as a system memory for storing data and/or software instructions. A typical CPU includes one or more processors each configured to execute software instructions. The software instructions can instruct a processor to fetch data from a location in the system memory (e.g., a random-access memory (RAM)) as part of a memory read operation, perform one or more CPU operations using the fetched/read data, and generate a result. The generated result may then be stored back into the system memory as a memory write operation as part of the instruction's execution in a processor.

One way to improve the processor workload performance is to reduce memory access latency by employing cache memory. Cache memory is typically provided as a small, high-speed, non-persistent memory (i.e., does not retain data below a minimum retention power/voltage or in the absence of power, such as present in a lower power mode) that is typically located physically close to a processor in a CPU of a processor-based system to minimize access latency. The cache memory provides temporary storage of frequently accessed data and instructions, thereby reducing the time it takes for the processor to retrieve this information from a main, system memory that is sized for the entire addressable space of the processor-based system. Cache memory can be organized in multiple cache levels such as level L1, level L2, and level L3, where level L1 cache memory is the fastest but smallest, and level L3 cache memory is larger in size but slower. A cache controller in the memory system can be configured to predict and store data that a processor is likely to need next or soon. In this manner, it is more likely that requested data is present in the cache memory for faster access, as opposed to only being present in higher levels of cache memory and/or in main memory. This improves overall system performance, reduces latency, and enhances the efficiency of processing tasks.

It is common to provide a non-persistent memory, such as a cache memory, as a static random access memory (RAM) (SRAM) because of its advantages. SRAM is faster than dynamic RAM (DRAM) for example because SRAM does not require periodic refreshing to maintain its data. This makes SRAM well-suited for cache memory where fast data access is essential. SRAM also provides lower access latency as compared to DRAM, thus enabling a processor to retrieve cached data almost instantaneously to improve overall system performance. While SRAM consumes more power than DRAM when active, it is more energy-efficient in scenarios where data needs to be accessed frequently, because it avoids the overhead of refreshing operations required in DRAM. However, SRAM also requires a minimum power and voltage level even at idle times to retain data. It may be desired to provide for a processor-based system to support reduction and/or collapsing of power to support lower power modes during idles time or times of lower performance to conserve power. However, power to the SRAM may not be able to be collapsed or lowered below a minimum operating voltage without retained data being lost.

SUMMARY OF THE DISCLOSURE

Aspects disclosed herein include priority-based restoration of offloaded data back into non-persistent memory in a processor-based system to reduce access misses. The processor-based system includes a memory system that includes a non-persistent memory(ies) (e.g., a cache memory(ies)). Non-persistent memory is memory that does not retain data when below a minimum power/voltage retention level and/or in the absence of power, such as during a lower power mode in the processor-based system. The non-persistent memory(ies) can be provided as static random access memory (SRAM) as an example. For example, if the processor-based system is used to support a wide local area network (WLAN), a non-persistent memory may include a large number of SRAM banks closely coupled to the processor for improved performance. When the processor-based system and/or a processor is placed into a lower power mode to conserve power, the processor-based system is configured to offload (i.e., copy) data (e.g., from memory pages) into a system memory, from areas (e.g., memory banks) designated as collapsible. The system memory is configured to retain data in the lower power mode either by being supplied with a sufficient power/voltage to retain data or being persistent memory. An area of non-persistent memory designated as collapsible is a memory area that is either decoupled from power or its power being lowered below a minimum retention power/voltage in a lower power mode, such that data cannot be retained. In this manner, power to such areas of the non-persistent memory can be collapsed or reduced below a minimum retention power/voltage during a lower power mode to conserve power. The offloaded data can then be restored (i.e., copied) from system memory back into its previously stored locations in non-persistent memory in response to exiting the lower power mode to again be accessible like previously accessible prior to entering the lower power mode to minimize access misses (e.g., cache misses) after exiting the lower power mode.

However, some offloaded data may be accessed first or sooner by a processor than other offloaded data after exiting a lower power mode. The processor-based system could be configured to require full restoration of all offloaded data from system memory back into non-persistent memory in response to exiting the lower power mode before a processor is allowed to perform memory accesses to avoid misses (e.g., cache misses) as a result of the offloaded data not being present in non-persistent memory. However, the latency in having to fully restore all offloaded data back into non-persistent memory before a processor is permitted to resume memory accesses reduces processor performance. The processor could alternatively be permitted to perform memory accesses during restoration of offloaded data to non-persistent memory before being fully restored, but this may result in increased access misses (e.g., cache misses) thus decreasing the hit/miss ratio in the processor-based system in an undesired manner.

Thus, in exemplary aspects, the processor-based system is configured to prioritize restoration of offloaded data from system memory back into non-persistent memory based on a determined priority ranking (i.e., ranking or order) of the offloaded data. For example, if data to be offloaded is from a non-persistent cache memory that is organized in memory banks, the processor-based system can be configured to determine the priority ranking of the offloaded data (e.g., from memory pages). In this manner, in response to exiting the lower power mode, the processor-based system can access the priority ranking of data offloaded into system memory from system memory, and use such priority ranking to restore offloaded data back into their original locations (e.g., memory banks) in non-persistent memory in an order based on their priority ranking. In this manner, by restoring offloaded data back into non-persistent memory in order of its priority ranking after exiting the lower power mode, data accessed by a processor after exiting the lower power mode is more likely to be restored and accessible in the non-persistent memory. This reduces/mitigates access misses (e.g., cache misses) as a result of entering and exiting the lower power mode. Also, this may allow a processor in the processor-based system to be permitted to perform memory accesses to non-persistent memory before the offloaded data is fully restored back to non-persistent memory, because it is more likely that data accessed by the processor after exiting a lower power mode will be present in the non-persistent memory resulting in a hit (e.g., a cache hit). If the offloaded data were not restored in priority order after exiting the lower power mode, this may result in a decreased hit/miss ratio that would provide a penalty greater than enforcing the processor only being able to perform memory accesses after exiting the lower power mode until all the offloaded data was fully restored to non-persistent memory.

In a non-limiting example, the processor-based system is configured to determine the priority ranking of the offloaded data in response to entering the lower power mode, based on a prediction of the data's access demand after exiting a lower power mode. The access demand of the data is an indication of when the data is likely to be first accessed after exiting the lower power mode. In this manner, the priority ranking used to determine the order of restoring the offloaded data from system memory to non-persistent memory in response to exiting the lower power mode can be based on a prediction of which offloaded data is more likely to be accessed first after exiting the lower power mode. The priority ranking of the offloaded data can be performed using one or more access demand attributes of the data and/or its storage location in non-persistent memory (e.g., memory bank) indicative its access demand after exiting a lower power mode. Examples of these access demand attributes include, but are not limited to, frequency of page access, page eviction rate, page retention time until evicted, and page miss most recently used page. In an example, the processor-based system is configured to store in system memory such priority ranking of data to be offloaded and/or the access demand attribute(s) used to determine the priority ranking of the data to be offloaded. The access demand attributes can also be restored to preserve their context that existed prior to entering the lower power mode.

In this regard, in one exemplary aspect, a processor-based system is provided. The processor-based system comprises a data offloading processor configured to, in response to entering a lower power mode in the processor-based system, determine a priority ranking of a plurality of designated memory pages identified be collapsed in the lower power mode in a non-persistent memory, and copy the plurality of designated memory pages into a system memory. The data offloading processor is also configured to, in response to exiting the lower power mode in the processor-based system, copy one or more designated memory pages of the plurality of designated memory pages from the system memory back to a non-persistent memory in order of the determined priority ranking.

In another exemplary aspect, a method of restoring offloaded data from a system memory to a non-persistent memory in a processor-based system in response to entering a lower power mode is provided. The method comprises, in response to entering the lower power mode in the processor-based system, determining a priority ranking of a plurality of designated memory pages identified to be collapsed in the lower power mode in the non-persistent memory, and copying one or more designated memory pages of the plurality of designated memory pages into the system memory. The method also comprises, in response to exiting the lower power mode in the processor-based system, copying the plurality of designated memory pages from the system memory back to the non-persistent memory in order of the determined priority ranking.

DETAILED DESCRIPTION

Figure 1:
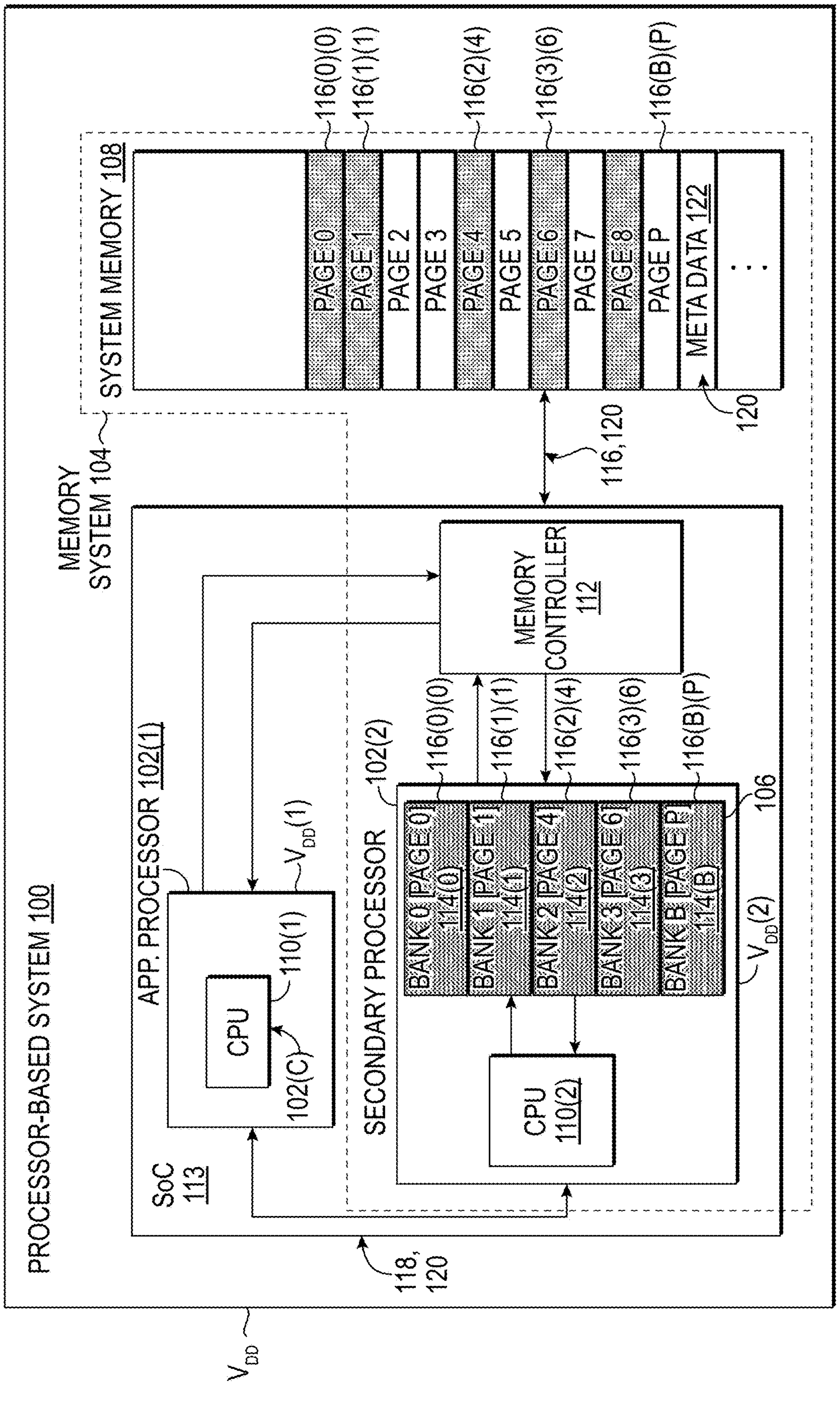
FIG. 1 is an exemplary processor-based system that includes a plurality of processors and a memory system that includes non-persistent memory and fully-addressable system memory, and includes a data offloading processor configured to perform a priority ranking of data (e.g., memory pages) to be offloaded from a non-persistent memory to a system memory in response to entering a lower power mode, and configured to restore (i.e., copy) the offloaded data from the system memory back into the non-persistent memory in an order of its priority ranking in response to exiting the lower power mode.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include priority-based restoration of offloaded data back into non-persistent memory in a processor-based system to reduce access misses. The processor-based system includes a memory system that includes a non-persistent memory(ies) (e.g., a cache memory(ies)). Non-persistent memory is memory that does not retain data when below a minimum power/voltage retention level and/or in the absence of power, such as during a lower power mode in the processor-based system. The non-persistent memory(ies) can be provided as static random access memory (SRAM) as an example. For example, if the processor-based system is used to support a wide local area network (WLAN), a non-persistent memory may include a large number of SRAM banks closely coupled to the processor for improved performance. When the processor-based system and/or a processor is placed into a lower power mode to conserve power, the processor-based system is configured to offload (i.e., copy) data (e.g., from memory pages) into a system memory, from areas (e.g., memory banks) designated as collapsible. The system memory is configured to retain data in the lower power mode either by being supplied with a sufficient power/voltage to retain data or being persistent memory. An area of non-persistent memory designated as collapsible is a memory area that is either decoupled from power or its power being lowered below a minimum retention power/voltage in a lower power mode, such that data cannot be retained. In this manner, power to such areas of the non-persistent memory can be collapsed or reduced below a minimum retention power/voltage during a lower power mode to conserve power. The offloaded data can then be restored (i.e., copied) from system memory back into its previously stored locations in non-persistent memory in response to exiting the lower power mode to again be accessible like previously accessible prior to entering the lower power mode to minimize access misses (e.g., cache misses) after exiting the lower power mode.

However, some offloaded data may be accessed first or sooner by a processor than other offloaded data after exiting a lower power mode. The processor-based system could be configured to require full restoration of all offloaded data from system memory back into non-persistent memory in response to exiting the lower power mode before a processor is allowed to perform memory accesses to avoid misses (e.g., cache misses) as a result of the offloaded data not being present in non-persistent memory. However, the latency in having to fully restore all offloaded data back into non-persistent memory before a processor is permitted to resume memory accesses reduces processor performance. The processor could alternatively be permitted to perform memory accesses during restoration of offloaded data to non-persistent memory before being fully restored, but this may result in increased access misses (e.g., cache misses) thus decreasing the hit/miss ratio in the processor-based system in an undesired manner.

Thus, in exemplary aspects, the processor-based system is configured to prioritize restoration of offloaded data from system memory back into non-persistent memory based on a determined priority ranking (i.e., ranking or order) of the offloaded data. For example, if data to be offloaded is from a non-persistent cache memory that is organized in memory banks, the processor-based system can be configured to determine the priority ranking of the offloaded data (e.g., from memory pages). In this manner, in response to exiting the lower power mode, the processor-based system can access the priority ranking of data offloaded into system memory from system memory, and use such priority ranking to restore the offloaded data back into their original locations (e.g., memory banks) in non-persistent memory in an order based on their priority ranking. In this manner, by restoring offloaded data back into non-persistent memory in order of its priority ranking after exiting the lower power mode, data accessed by a processor after exiting the lower power mode is more likely to be restored and accessible in the non-persistent memory. This reduces/mitigates access misses (e.g., cache misses) as a result of entering and exiting the lower power mode. Also, this may allow a processor in the processor-based system to be permitted to perform memory accesses to non-persistent memory before the offloaded data is fully restored back to non-persistent memory, because it is more likely that data accessed by the processor after exiting a lower power mode will be present in the non-persistent memory resulting in a hit (e.g., a cache hit). If the offloaded data were not restored in priority order after exiting the lower power mode, this may result in a decreased hit/miss ratio that would provide a penalty greater than enforcing the processor only being able to perform memory accesses after exiting the lower power mode until all the offloaded data was fully restored to non-persistent memory.

In this regard, FIG. 1 is an exemplary processor-based system 100 that includes a first processor 102(1), a secondary processor 102(2), and a memory system 104 that includes non-persistent memory 106 and a fully-addressable system memory 108. For example, the non-persistent memory 106 can be one or more cache memories that can be provided as static random access memory (SRAM). A non-persistent memory, such as the non-persistent memory 106, is a memory that does not retain data when its supply power/voltage is below a minimum retention power/voltage. Thus, if the supply power/voltage of the non-persistent memory 106 is lowered below its minimum retention power/voltage or collapsed (i.e., power removed), such as during a lower power mode in the processor-based system 100, data stored in the non-persistent memory 106 is not retained. Each processor 102(1), 102(2) in this example includes a respective central processing unit (CPU) 110(1), 110(2) that is configured to execute program instructions to carry out tasks in the processor-based system 100. Note that any number of processors desired can be provided in the processor-based system 100.

In this example, the non-persistent memory 106 is provided along with the CPU 110(2) as part of the secondary processor 102(2). For example, this may be desired to closely physically couple the non-persistent memory 106 to the CPU 110(2) for performing high-speed operations, such as if the secondary processor 102(2) is used for WLAN applications, for improved performance. For example, if the non-persistent memory 106 is a cache memory, in response to a cache miss for a memory access request by the CPU 110(2) to the non-persistent memory 106, a memory controller 112 as part of the memory system 104 is configured to retrieve the data for the memory access request from the system memory 108 and load such data into an entry in the non-persistent memory 106 that is evicted. The system memory 108 may be persistent memory and/or memory that is retained at a minimum retention power/voltage during lower power modes in the processor-based system 100 to be able to retain data. The system memory 108 may be dynamic double rate (DDR) dynamic random access memory (DRAM) as an example. The processors 102(1), 102(2) and non-persistent memory 106 are shown in FIG. 1 as being included in a single semiconductor die as a system-on-a-chip (SoC) 113 in this example, but such is not limiting.

It is desired for the processor-based system 100 to support different power mode(s). For example, an overall supply voltage $V_{DD}$ can be provided to the processor-based system 100 to provide power for operations. Other supply voltages $V_{DD(1)}$, $V_{DD(2)}$ that are based on the supply voltage $V_{DD}$ or independently derived from a power management IC as examples, can be provided to the individual processors 102(1), 102(2) for example to be able to particularly control the power supplied to the individual processors 102(1), 102(2) such as to conserve power or to increase power for increased performance. In a lower power mode for the processor-based system 100, it may be desired for example, to lower and/or collapse the supply voltage $V_{DD(2)}$ provided to the secondary processor 102(2) to conserve power, such as during idle modes, while still retaining a higher supply voltage to the processor 102(1) and system memory 108 for performing operation and for retention of data. In this manner, power can be lowered and/or collapsed to the secondary processor 102(2) during a lower power mode to conserve power without affecting the ability of the application processor 102(1) and system memory 108 to operate as normal, but also increased when it is desired for the secondary processor 102(2) to be active. In this manner, power can be selectively controlled to conserve power consumed in the processor-based system 100 in lower power modes. In this example, the application processor 102(1) is configured to control the power mode of the secondary processor 102(2) so that the application processor 102(1) can continue to operate to also exit the lower power mode in the secondary processor 102(2) when the secondary processor 102(2) needs to be active to perform processing in the processor-based system 100.

Figure 2B:
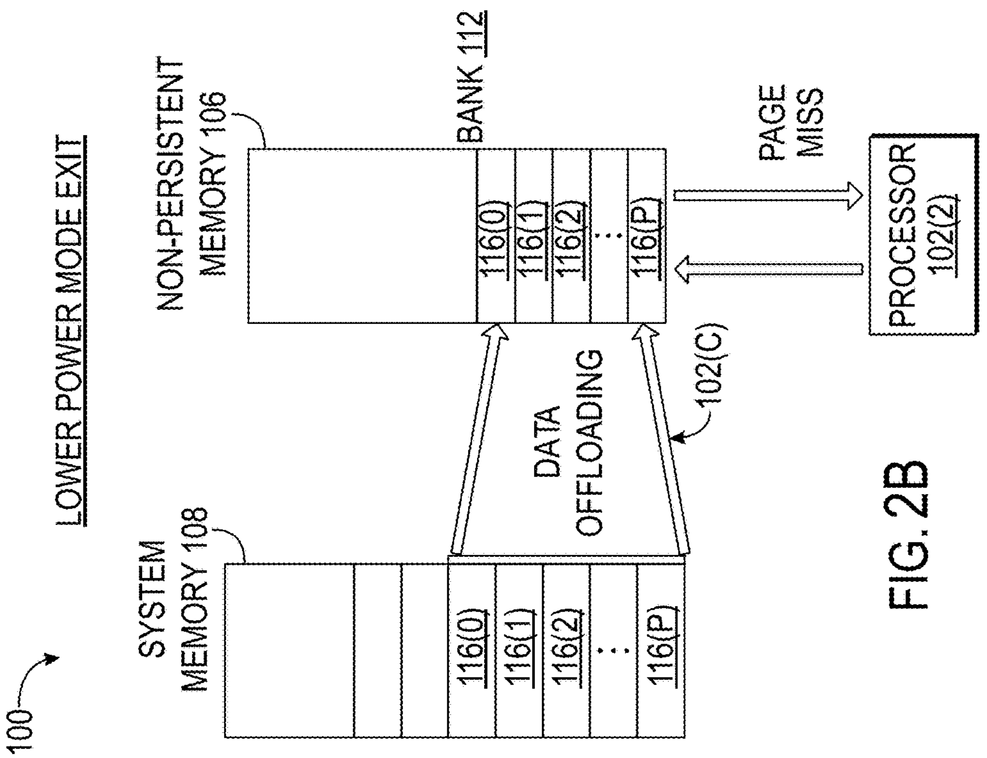
FIG. 2B is a schematic diagram illustrating an example of the data offloading processor in FIG. 1 restoring (i.e., copying) offloaded data from system memory to their original memory banks in non-persistent memory in response to exiting the lower power mode, wherein the restored data are memory pages that were previously offloaded to system memory in FIG. 2A in response to entering the lower power mode.
Figure 2A:
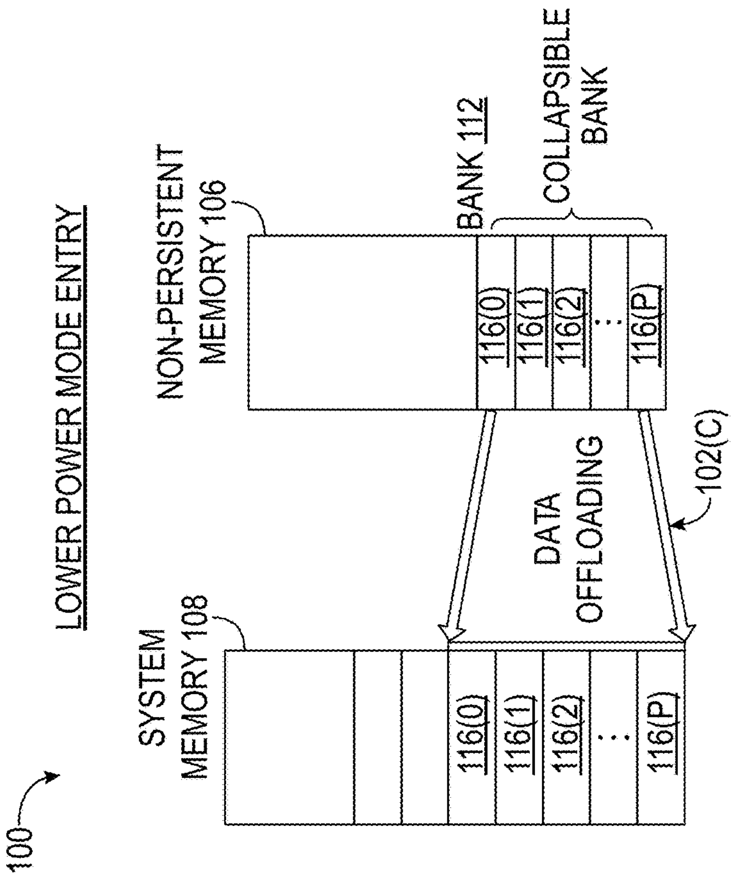
FIG. 2A is a schematic diagram illustrating an example of the data offloading processor in FIG. 1 copying data (e.g., from memory pages) in memory banks in a non-persistent memory designated as collapsible in a lower power mode, into system memory in response to entering a lower power mode.

When the secondary processor 102(2) is placed into a lower power mode to conserve power for example by lowering and/or collapsing the supply voltage $V_{DD(2)}$ to the secondary processor 102(2), the processor-based system 100, and more particularly the data offloading processor 102(C) in this example, is configured to offload (i.e., copy) or cause to be offloaded, data stored in the non-persistent memory 106 into the system memory 108. This is so that such data is retained in the system memory 108 when the secondary processor 102(2) is placed in the lower power mode. Lowering and/or collapsing the supply voltage $V_{DD(2)}$ collapses memory banks 114(0)-114(B) in the non-persistent memory 106, but does not collapse the system memory 108 in this example. This is shown by example in FIG. 2A, wherein in response to entering the lower power mode, memory pages 116(0)-116(P) for a designated memory bank(s) 114 to be offloaded into the system memory 108, are copied from their memory bank 114 to the system memory 108. The data offloading processor 102(C) could be the CPU 110(1) of the application processor 102(1), the CPU 110(2) of the secondary processor 102(2), and/or another processor outside of the processors 102(1), 102(2) as examples. A portion of the system memory 108 can be partitioned to provide room for storing offloaded data from the non-persistent memory 106 in a lower power mode. For example, the non-persistent memory 106 may be an SRAM that is organized into 'B+1' memory banks 114(0)-114(B), wherein 'B' can be any positive whole integer. A memory bank, including the memory banks 114(0)-114(B), is a logical unit of storage which includes dedicated access circuitry to access memory pages within the memory bank. Thus, multiple memory banks 114(0)-114(B) can be accessed at the same time. Each memory bank 114(0)-114(B) has 'P+1' memory pages 116(0)(0)-116(B)(P). When a memory page is referenced herein, it can refer to the data stored in a memory page location in its given memory bank. In this regard, as an example for clarity purposes, memory bank 114(0) has '0-P' memory pages 116(0)(0)-116(0)(P). As another example, memory bank 114(B) has '0-P' memory pages 116(B)(0)-116(B)(P). A memory page, including each of the memory pages 116(0)(0)-116(B)(P), is a fixed-length contiguous block of memory in a memory bank that is accessible as a single entry in a page table. Typically, only one memory page 116(0)(0)-116(B)(P) can be open and accessed in its given respective memory bank 114(0)-114(B) at a time.

In this manner, by the data offloading processor 102(C) storing data from the non-persistent memory 106 into the system memory 108 in response to entering a lower power mode in the secondary processor 102(2), such offloaded data can then be restored (i.e., copied) by the data offloading processor 102(C) from the system memory 108 back into its previously stored locations in the non-persistent memory 106 in response to exiting the lower power mode. In this regard, such data can again be accessible to the secondary processor 102(2) like previously accessible prior to entering the lower power mode, to minimize access misses (e.g., cache misses) after exiting the lower power mode. In this example, as shown in FIG. 1, the data offloading processor 102(C) is configured to send requests 118 to the secondary processor 102(2) in response to entering and exiting the lower power mode to cause the secondary processor 102(2) to offload data from the non-persistent memory 106 through the memory controller 112 to the system memory 108 and to restore the offloaded data from the system memory 108 back to the non-persistent memory 106. This is shown by example in FIG. 2B, wherein in response to exiting the lower power mode, the previously offloaded memory pages 116(0)-116 (P) for a designated memory bank(s) 114 offloaded into the system memory 108, are copied back from the system memory 108 back to their original memory bank 114 and location in the non-persistent memory 106.

In this example, as shown in FIG. 1, only a designated subset of the memory banks 114(0)-114(B) in the non-persistent memory 106 may be able to be designated as memory pages to be retained over a lower power mode cycle. In this regard, the data offloading processor 102(C) may be configured to only copy memory pages 116(0)(0)-116(B)(P) from the designated subset of memory banks 114(0)-114(B) to the system memory 108 in response to entering a lower power mode. Whether some or all of the memory banks 114(0)-114(B) in the non-persistent memory 106 are designated for their memory pages 116(0)(0)-116 (B)(P) to be collapsible and their data retained in a lower power mode cycle, some of the offloaded memory pages 116(0)(0)-116(B)(P), the secondary processor 102(2) may be configured to be permitted to access the non-persistent memory 106 for memory access requests after exiting the lower power mode, even before all the offloaded memory pages 116(0)(0)-116(B)(P) are restored from the system memory 108 back to the non-persistent memory 106. If a memory access request by the secondary processor 102(2) is to a memory page 116(0)(0)-116(B)(P) that has not yet been restored, this may result in a miss, thus requiring the memory controller 112 to retrieve the memory page from the system memory 108. Allowing the secondary processor 102(2) to perform memory access requests before the offloaded memory pages 116(0)(0)-116(B)(P) are fully restored may result in a decreased hit/miss ratio to the non-persistent memory 106. Alternatively, the processor-based system 100 could be configured to require full restoration of all offloaded memory pages 116(0)(0)-116(B)(P) from system memory 108 back into the non-persistent memory 106 in response to exiting the lower power mode before the secondary processor 102(2) is allowed to perform memory accesses to avoid access misses (e.g., cache misses). However, the latency in having to fully restore all offloaded memory pages 116(0)(0)-116(B)(P) back into the non-persistent memory 106 before the secondary processor 102(2) is permitted to resume memory accesses reduces performance in the secondary processor 102(2).

In this regard, as discussed in more detail in other examples below, the data offloading processor 102(C) is configured to determine a priority ranking 120 of designated data 116 (e.g., designated memory pages 116(0)(0)-116(B) (P)) to be offloaded from the non-persistent memory 106 to the system memory 108 in response to entering a lower power mode, after exiting the lower power mode. For example, the priority ranking 120 can be based on a prediction of access demand of the offloaded data. Access demand is the likelihood of data being accessed sooner, such as by the application processor 102(1), in response to exiting the lower power mode. Alternatively, the data offloading processor 102(C) could issue a request for the secondary processor 102(2) to determine the priority ranking 120. The priority ranking of designated data to be offloaded from the non-persistent memory 106 is a priority order of the data designating which data should first be restored back from the system memory 108 to the non-persistent memory 106 in response to exiting the lower power mode. For example, the priority ranking 120 of the designated data determined by the data offloading processor 102(C) can be stored as metadata 122 in the system memory 108 so that it is retained over the lower power mode in the secondary processor 102(2). Thus, in response to exiting the lower power mode, the data offloading processor 102(C) can be configured to access or cause the offloaded data 116 in the system memory 108 to be accessed and copied back to the non-persistent memory 106 in the order of the priority ranking 120 so that the offloaded data 116 is restored in order of the priority ranking 120 back to the non-persistent memory 106. In this manner, memory access requests by the application processor 102(1) to the non-persistent memory 106 after exiting the lower power mode is more likely to be present in the non-persistent memory 106, thus resulting in fewer misses and a higher hit/miss ratio than otherwise, and without having to fully restore the offloaded data 116 to the non-persistent memory 106 before allowing memory access requests from the application processor 102(1).

Figure 3:
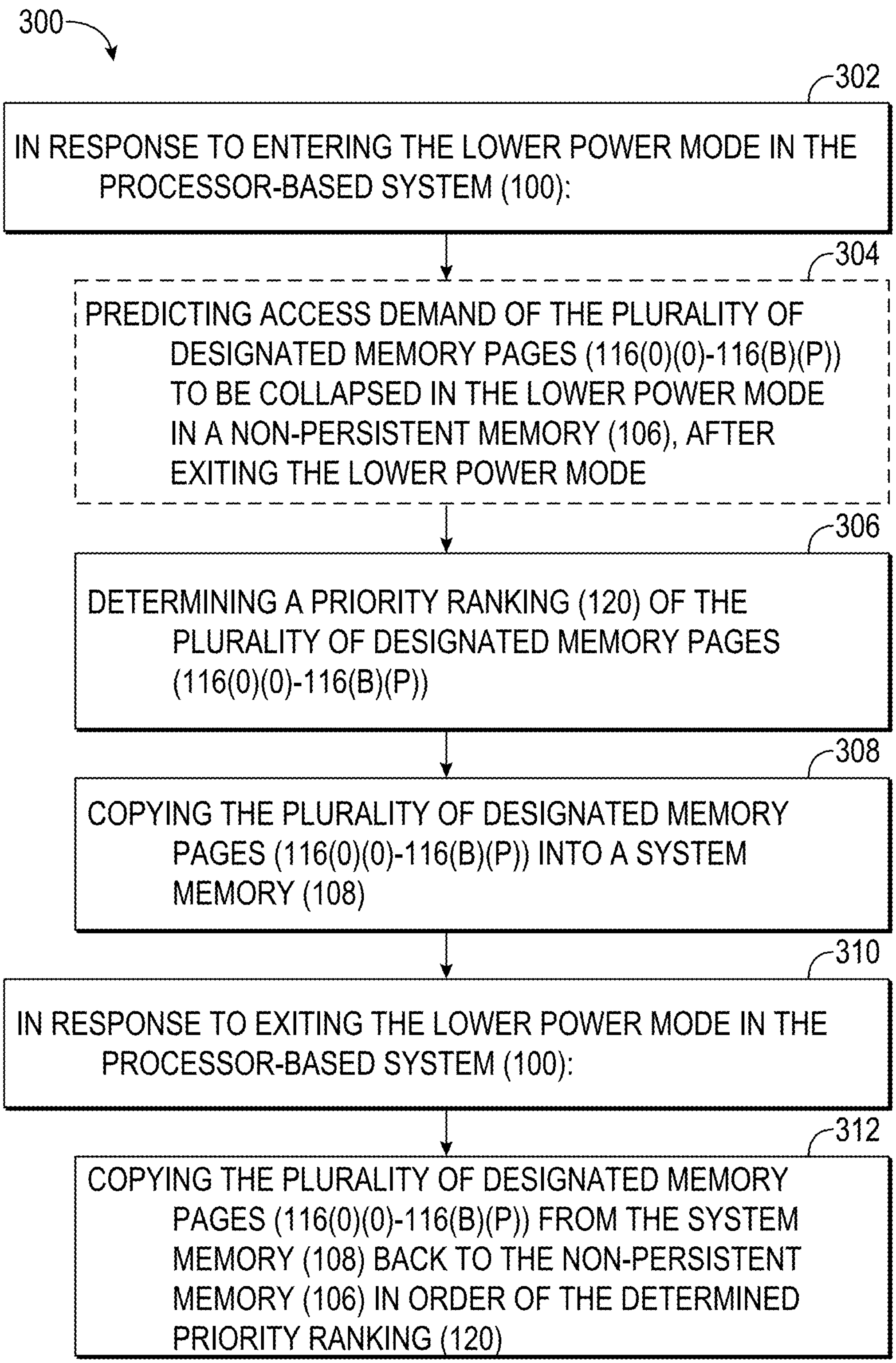
FIG. 3 is a flowchart illustrating an exemplary process of a data offloading processor in a processor-based system, such as the data offloading processors in the processor-based systems in FIG. 1, generating a priority ranking of data that is offloaded from a non-persistent memory into system memory after exiting the lower power mode in response to entering a lower power mode for the non-persistent memory, and restoring the offloaded data from the system memory back to its non-persistent memory in an order of its priority ranking.

FIG. 3 is a flowchart illustrating an exemplary process 300 of a data offloading processor in a processor-based system, including the processor-based system 100 in FIG. 1, by generating a priority ranking of data that is offloaded from a non-persistent memory into a system memory after exiting the lower power mode in response to entering a lower power mode for the non-persistent memory, and restoring the offloaded data from the system memory back to its non-persistent memory in order of its priority ranking. The exemplary process 300 in FIG. 3 is discussed in reference to the processor-based system 100 in FIG. 1 as an example, but such is not limiting.

In this regard, as shown in FIG. 3, in response to entering the lower power mode in the processor-based system 100 (block 302 in FIG. 3), the data offloading processor 102(C) can be optionally configured to predict access demand of the plurality of designated memory pages 116(0)(0)-116(B)(P) to be collapsed in the lower power mode in the non-persistent memory 106, after exiting the lower power mode (block 304 in FIG. 3). Access demand prediction of the designated memory pages 116(0)(0)-116(B)(P) is a prediction of the likelihood of each of the designated memory pages 116(0) (0)-116(B)(P) being accessed sooner, such as by the application processor 102(1), in response to exiting the lower power mode. As discussed by example in more detail below, the prediction of access demand of the designated memory pages 116(0)(0)-116(B)(P) can based on one or more access demand attributes that existed for the memory pages 116(0)(0)-116(B)(P) in non-persistent memory 106 (e.g., as context information in the processor-based system 100) indicative of when such memory pages 116(0)(0)-116(B) (P) may be first accessed after exiting the lower power mode. Examples of the access demand attributes 422 include, but are not limited to, frequency of access of a designated memory page 116(0)(0)-116(B)(P), frequency of access of a designated memory page 116(0)(0)-116(B)(P) after exiting the lower power mode, eviction rate of a designated memory page 116(0)(0)-116(B)(P), retention time of a designated memory page until its eviction, page misses on a designated memory page 116(0)(0)-116(B)(P), and the designated memory page 116(0)(0)-116(B)(P) being recently used before entering the lower power mode.

With continuing reference to FIG. 3, also in response to entering the lower power mode in the processor-based system 100, the data offloading processor 102(C) is configured to determine a priority ranking 120 of the designated memory pages 116(0) (0)-116(B)(P) (block 306 in FIG. 3). The priority ranking 120 of the designated memory pages 116(0)(0)-116(B)(P) is a rank or order of the memory pages 116(0)(0)-116(B)(P) indicating which designated memory pages 116(0)(0)-116(B)(P) should first be restored back from the system memory 108 to the non-persistent memory 106 before other designated memory pages 116(0)(0)-116(B)(P), in response to exiting the lower power mode. In an example, the priority ranking 120 of the designated memory pages 116(0)(0)-116(B)(P) can be based on an optionally determined access demand prediction of the designated memory pages 116(0)(0)-116(B)(P) from most likely to be accessed sooner to least likely to be accessed sooner, or vice versa, after exiting the lower power mode as the priority ranking 120. Thus, the offloading processor 102(C) can use the priority ranking 120 of the offloaded designated memory pages 116(0)(0)-116(B)(P) to determine the order in which to restore the offloaded designated memory pages 116(0) (0)-116(B)(P) from system memory 106 to non-persistent memory 106.

With continuing reference to FIG. 3, in response to entering the lower power mode in the processor-based system 100, the data offloading processor 102(C) is configured to copy the plurality of designated memory pages 116(0)(0)-116(B)(P) into the system memory 108 (block 308 in FIG. 3). Then, in response to exiting the lower power mode in the processor-based system 100 (block 310 in FIG. 3), the data offloading processor 102(C) is configured to copy one or more designated memory pages of the plurality of designated memory pages 116(0)(0)-116(B)(P) from the system memory 108 back to the non-persistent memory 106 in order of the determined priority ranking 120 (block 312 in FIG. 3).

Figure 4:
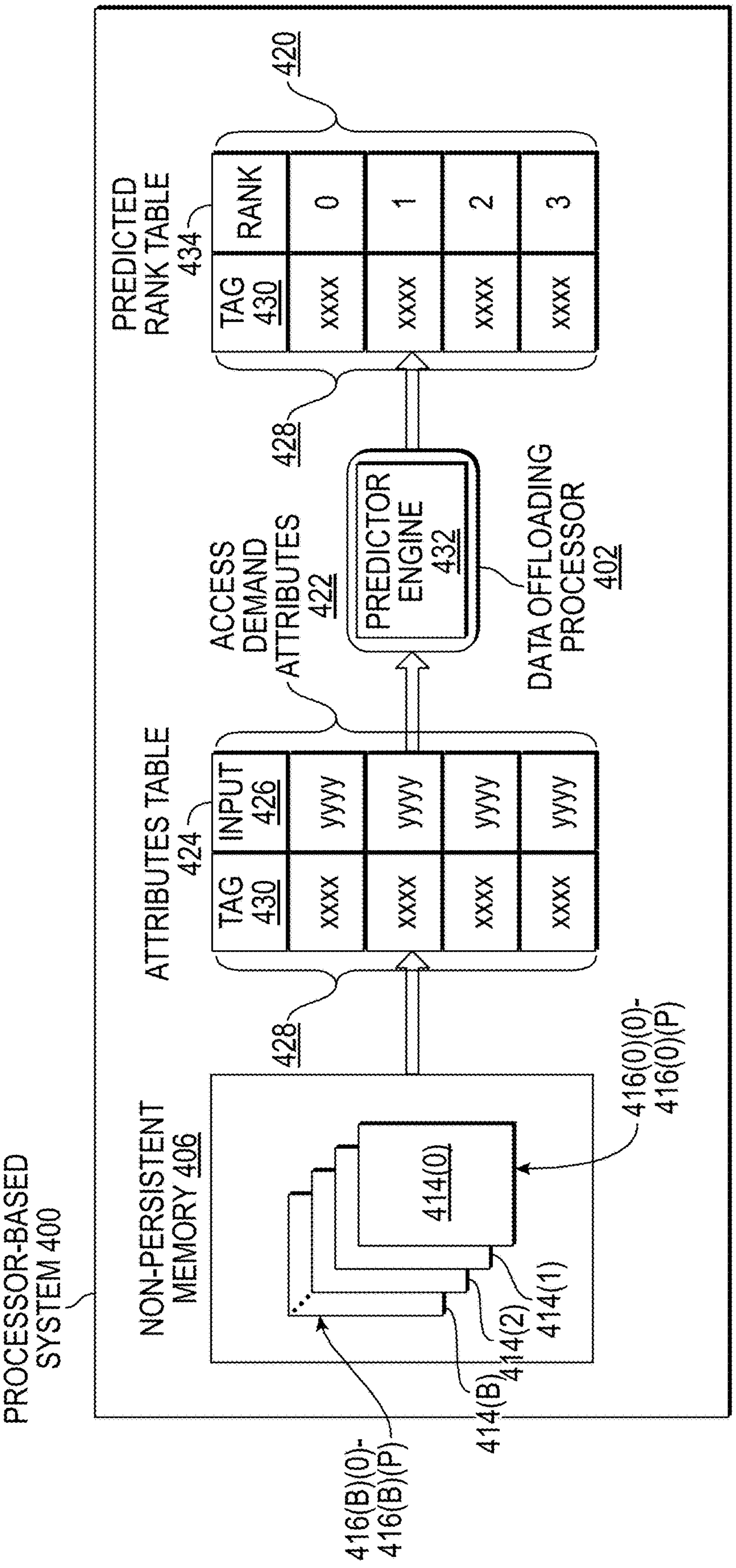
FIG. 4 is schematic diagram of another exemplary processor-based system that includes a data offloading processor configured to perform a priority ranking of data (e.g., memory pages) to be offloaded from a non-persistent memory to a system memory in response to entering a lower power mode, based on a prediction of access demand of the offloaded data after exiting the lower power mode, and configured to restore (i.e., copy) the offloaded data from the system memory back into the non-persistent memory in an order of its priority ranking in response to exiting the lower power mode.

FIG. 4 is schematic diagram of another exemplary processor-based system 400 similar to the processor-based system 100 in FIG. 1, and which includes a data offloading processor 402 configured to offload (i.e., copy) data from a non-persistent memory 406 to a system memory (like the system memory 108 in FIG. 1) in response to entering a lower power mode. The data offloading processor 402 is configured to restore (i.e., copy) the offloaded data from the system memory back into the non-persistent memory 406 in response to exiting the lower power mode. Examples of the non-persistent memory 406 in FIG. 4 can be examples of the non-persistent memory 106 discussed above with regard to FIGS. 1, 2A, and 2B. In this example, as discussed in more detail below, the data offloading processor 402 in the processor-based system 400 in FIG. 4 is configured to perform a priority ranking of data (e.g., memory pages) to be offloaded from the non-persistent memory 406 to a system memory in response to entering a lower power mode, based on a prediction of access demand of the offloaded data after exiting the lower power mode. The data offloading processor 402 is then configured to restore (i.e., copy) the offloaded data from the system memory back into the non-persistent memory 406 in order of its priority ranking in response to exiting the lower power mode.

In this regard, as shown in FIG. 4, the data offloading processor 402 is configured to predict the access demand of each designated or every memory page 416(0) (0)-416(B)(P) among the designated memory banks 414(0)-414(B) to be offloaded and restore in response to entering and exiting a lower power mode in the processor-based system 400, relative to the other designated or every memory page 416(0)(0)-416(B)(P) of the designated memory pages 416 (0)(0)-416(B)(P) in the designated memory banks 414(0)-414(B). In this example, the access demand of the designated memory pages 416(0)(0)-416(B)(P) is based on one or more access demand attributes 422 that are indicative of when such memory pages 416(0)(0)-416(B)(P) may be first accessed after exiting the lower power mode. Examples of the access demand attributes 422 include, but are not limited to, frequency of access of a designated memory page 416 (0)(0)-416(B) (P), frequency of access of a designated memory page 416(0)(0)-416(B)(P) after exiting the lower power mode, eviction rate of a designated memory page 416(0)(0)-416(B)(P), retention time of a designated memory page until its eviction, page misses on a designated memory page 416(0)(0)-416(B)(P), and the designated memory page 416(0)(0)-416(B) (P) being recently used before entering the lower power mode.

In this regard, the data offloading processor 402 or other processor in the processor-based system 400 is configured to collect the access demand attributes 422 regarding access to the memory pages 416(0)(0)-416(B)(P) in the memory banks 414(0)-414(B) indicative of their access demand in response to entering the lower power mode. For example, the offloading processor 402 or other processor in the processor-based system 400 can be configured to capture a snapshot of access demand attributes 422 for the designated memory pages 416(0)(0)-416(B)(P) that exist just after receiving an indication of the lower power mode to be entered. For example, in response to entering a lower power mode, the data offloading processor 402 may be configured to capture the access demand attributes 422 regarding the designated memory pages 416(0)(0)-416(B) (P) in the designated memory banks 414(0)-414(B) to be offloaded into an attributes table 424. The access demand attributes 422 can be stored in an attribute row 428 relative to a tag 430 that corresponds to a designated memory page 416(0)(0)-416(B)(P). In this manner, the tag 430 identifies the designated memory page 416(0)(0)-416(B)(P) for which an access demand attribute 422 is received to correlate such access demand attribute 422 to its relevant designated memory page 416(0)(0)-416(B)(P).

With continuing reference to FIG. 4, in this example, the data offloading processor 402 includes a predictor engine 432 (e.g., an application executing in the processor 402) that is configured to receive the access demand attributes 422 captured for the designated memory pages 416(0)(0)-416(B)(P) in response to entering the lower power mode, and generate a priority ranking 420 of the designated memory pages 416(0) (0)-416(B)(P) organized in a predicted rank table 434 corresponding to the tag 430 of the designated memory pages 416(0)(0)-416(B)(P). The data offloading processor 402 may be configured to determine the priority ranking 420 based on a regression prediction model executed on the access demand attributes 422 captured for the designated memory pages 416(0)(0)-416(B)(P). The priority ranking 420 is an order for the designated memory pages 416(0)(0)-416(B)(P), where for example, a priority rank of '0' is last in order, a priority rank of '1' is next to last in order, and so forth, or the priority ranking could be encoded in reverse. The data offloading processor 402 can be configured to store the determined priority ranking 420 in the organization of the predicted rank table 434 in the system memory in which the designated memory pages 416(0)(0)-416(B)(P) are offloaded in response to entering the lower power mode. In this manner, as discussed below, when the lower power mode is exited, the determined priority ranking 420 can be used to determine the order in which to restore (i.e., copy) the offloaded designated memory pages 416(0)(0)-416(B)(P) from the system memory back into the non-persistent memory 406.

Figures 5A, 5B, 5C:
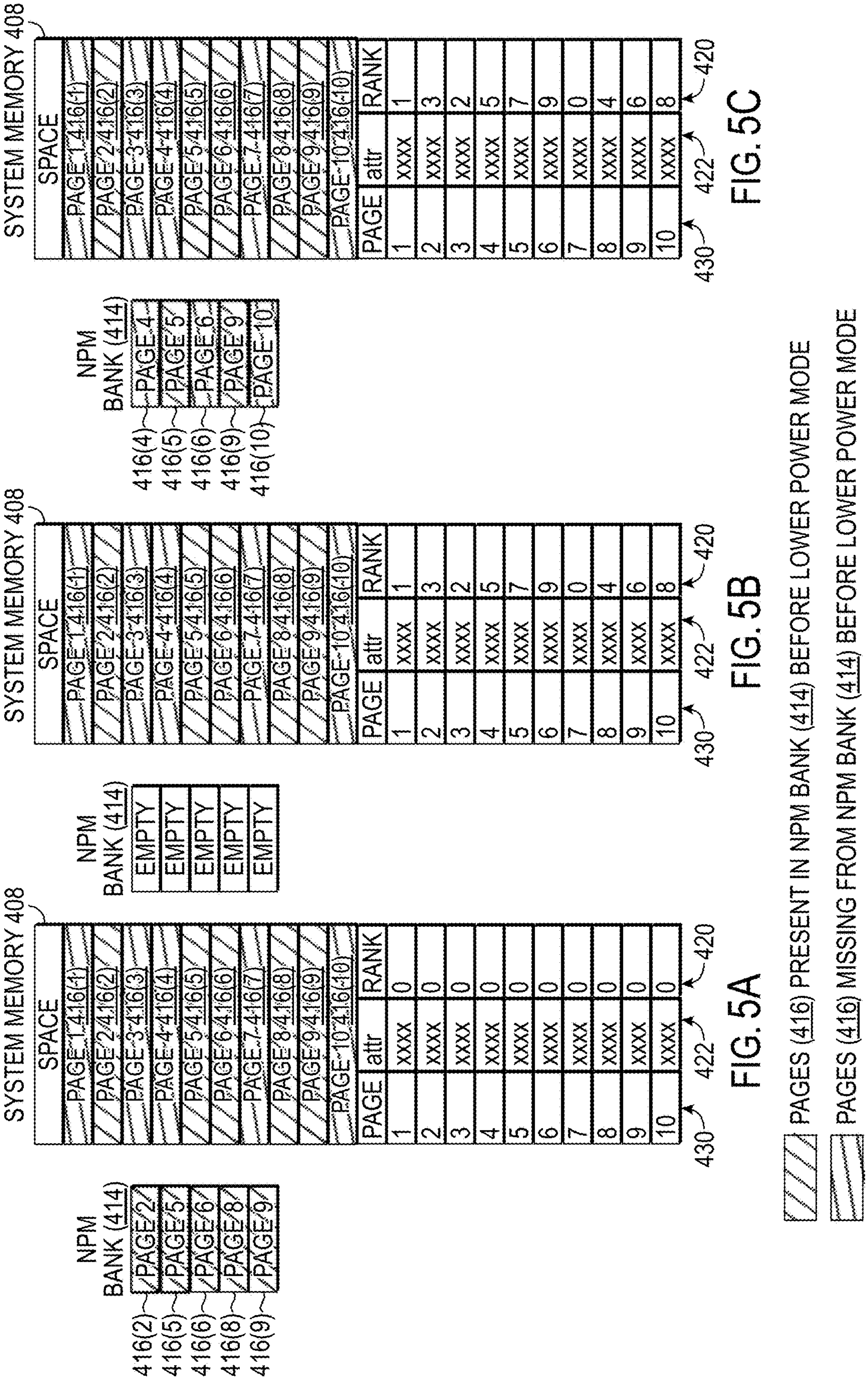
FIG. 5A illustrates exemplary states of system memory and a memory bank in non-persistent memory prior to entering a lower power mode and the data offloading processor in FIG. 4 generating a priority ranking table of a priority ranking of data (e.g., memory pages) to be offloaded from non-persistent memory into system memory.
FIG. 5B illustrates exemplary states of the system memory and the memory bank in the non-persistent memory in FIG. 5A in response to entering the lower power mode and the data offloading processor in FIG. 4 offloading data from the non-persistent memory bank into system memory and storing a generated priority ranking table in the system memory that includes a priority ranking of data (e.g., memory pages) offloaded from the non-persistent memory bank into the system memory in response to entering the lower power mode.
FIG. 5C illustrates exemplary states of the system memory and the memory bank in the non-persistent memory bank in FIG. 5A in response to exiting the lower power mode and the data offloading processor in FIG. 4 restoring the offloaded data in the system memory back to its non-persistent memory bank in an order of its priority ranking of the data (e.g., memory pages) from the priority ranking table stored in the system memory.

This is further illustrated by example in exemplary states of the non-persistent memory 406 and a system memory 408 in the processor-based system 400 in FIG. 4. The system memory 408 can be the system memory referenced above in FIG. 4 in which the designated memory pages 416(0)(0)-416(B)(P) in the non-persistent memory 406 are offloaded in response to entering the lower power mode. In this regard, FIG. 5A illustrates exemplary states of the system memory 408 and a memory bank 414 in the non-persistent memory 406 prior to entering a lower power mode. Note that although only one memory bank 414 is shown, the non-persistent memory 406 can include multiple memory banks. As shown in FIG. 5A, memory pages 416(2), 416(5), 416(6), 416(8), and 416(9) are present in the memory bank 414 of the non-persistent memory 406 prior to entering a lower power mode. Then, as shown in FIG. 5B, in response to entering the lower power mode, the predictor engine 432 in the data offloading processor 402 in FIG. 4 is configured to generate the priority ranking 420 for the designated memory pages 416(2), 416(5), 416(6), 416(8), and 416(9) in the memory bank 414, and store the priority ranking 420 as metadata in the system memory 408. The data offloading processor 402 is also configured to offload the designated memory pages 416(2), 416(5), 416(6), 416(8), and 416(9) from the non-persistent memory 406 to the system memory 408. The designated memory pages 416(2), 416(5), 416(6), 416(8), and 416(9) in the memory bank 414 of the non-persistent memory 406 are considered to be empty in the lower power mode after being offloaded to the system memory 408, because the power to the non-persistent memory 406 is either lowered below its minimum retention power/voltage or collapsed in the lower power mode.

Then as shown in FIG. 5C, in response to exiting the lower power mode, the data offloading processor 402 has used the priority ranking 420 of the offloaded designated memory pages 416(2), 416(5), 416(6), 416(8), and 416(9) to determine an order of restoring the memory pages 416(2), 416(5), 416(6), 416(8), and 416(9) back to the non-persistent memory 406. Note in this example, the memory pages 416(6), 416(10), 416(5), 416(9), and 416(4) have the highest respective priority rankings of '9', '8', '7', '6', and '5'. Thus, the data offloading processor 402 is configured to restore the memory pages 416(6), 416(10), 416(5), 416(9), and 416(4) to the non-persistent memory 406 in response to exiting the lower power mode and in their order of highest priority ranking to lowest priority ranking. In this example, memory pages 416(4) and 416(10) were not present in the non-persistent memory 406 when entering the lower power mode, but had access demand attributes 422 that were higher priority than memory pages 416(2) and 416(8) present in the non-persistent memory 406 prior to entering the lower power mode. In this regard, in this example, the data offloading processor 402 restores the memory pages 416(4) and 416(10) that were not designated memory pages to be offloaded in response to entering the lower power mode as being determined to have a higher priority ranking than offloaded designated memory pages 416(2) and 416(8). Thus, in this example, memory pages 416(4) and 416(10) are restored from the system memory 408 to the non-persistent memory 406 in response to exiting the lower power mode based on their higher predicted access demand to reduce access misses. However, in another aspect, the data offloading processor 402 could be configured to just perform priority ranking and restoration of only the memory pages 416 that were present in the non-persistent memory 406 prior to entering the lower power mode.

In another exemplary aspect, the data offloading processor 402 in FIG. 4 could be configured to designate certain memory pages 416 in a given memory bank 414 as higher priority and other memory pages 416 in a given memory bank as lower priority. The data offloading processor 402 could then be configured to first restore each of the higher priority memory pages 416 in response to exiting the lower power mode, before restoring the lower priority memory pages 416 even if any lower priority memory pages 416 have a higher priority ranking than any of the higher priority memory pages 416. The processor-based system 400 could be configured to not allow another processor to perform memory accesses after exiting the lower power mode to the non-persistent memory 406 until the higher priority memory pages 416 are first restored to the non-persistent memory 406. The processor-based system 400 could then be configured to allow another processor to concurrently perform memory accesses to the non-persistent memory 406 after exiting the lower power mode concurrently with the restoration of the lower priority memory pages 416. This is shown by example in the process 600 in FIG. 6 discussed below.

Figure 6:
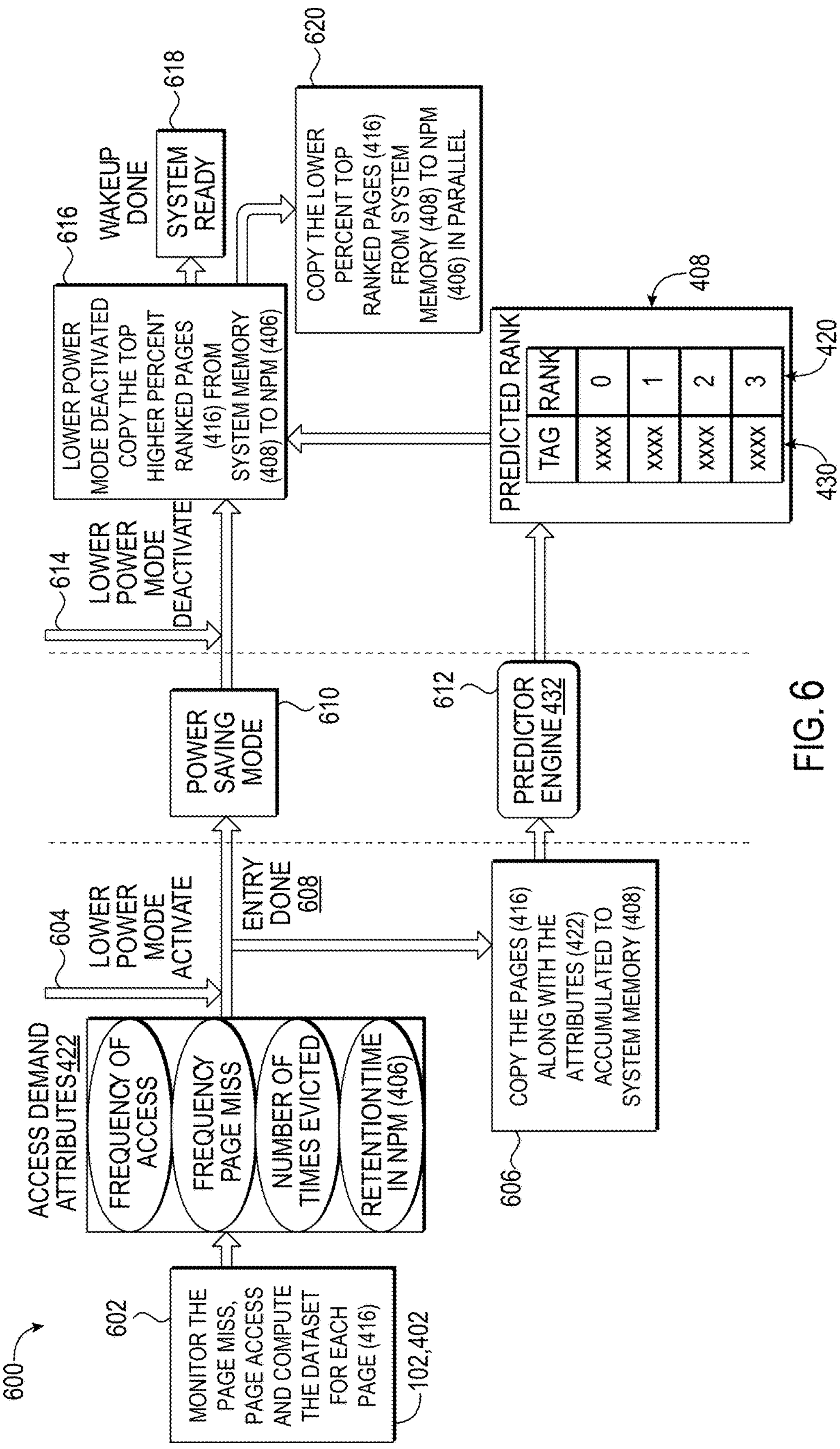
FIG. 6 is a flowchart illustrating another exemplary process of a data offloading processor in a processor-based system, such as the data offloading processors in the processor-based systems in FIGS. 1, 2, and 4, generating a priority ranking of data that is offloaded from a non-persistent memory into system memory based on a prediction of the access demand of the offloaded data after exiting the lower power mode in response to entering a lower power mode for the non-persistent memory, and restoring the offloaded data from the system memory back to its non-persistent memory in an order of its priority ranking.

FIG. 6 is a flowchart illustrating another exemplary process 600 of a data offloading processor in a processor-based system, such as the data offloading processors 102(C), 402 in the processor-based systems 100, 400 in FIGS. 1, 2, and 4, generating a priority ranking of data that is offloaded from a non-persistent memory into system memory based on a prediction of the access demand of the offloaded data after exiting the lower power mode in response to entering a lower power mode for the non-persistent memory, and restoring the offloaded data from the system memory back to its non-persistent memory in an order of its priority ranking. The process 600 is discussed in reference to the processor-based system 400 in FIG. 4, but such is not limiting.

In this regard, as shown in FIG. 6, the process 600 starts with the accesses to the memory pages 416 in the non-persistent memory 406 being tracked that affect the access demand attributes 422 (block 602 in FIG. 6). The tracked accesses to the memory pages 416 in the non-persistent memory 406 are used to generate the access demand attributes 422. Then, in response to receiving an indication of entering a lower power mode (block 604 in FIG. 6), the data offloading processor 402 is configured to copy the designated memory pages 416 to be offloaded from the non-persistent memory 406 to the system memory 408 along with the access demand attributes 422 for the designated memory pages 416 (block 606 in FIG. 6). After offloading the designated memory pages 416 from the non-persistent memory 406 to the system memory 408 is completed (block 608 in FIG. 6), the processor-based system 400 enters the lower power mode, which may involve reducing or collapsing the power of the non-persistent memory 406 (block 610 in FIG. 6). The predictor engine 432 in the data offloading processor 402 is configured to predict the access demand of the designated memory pages 416 offloaded from the non-persistent memory 406 to the system memory 408 in response to entering the lower power mode and based on the access demand attributes 422 to determine the priority ranking 420 for the offloaded designated memory pages 416 and copying such priority ranking 420 into the system memory 408 (block 612 in FIG. 6).

Then, with continued reference to FIG. 6, in response to receiving an indication of exiting the lower power mode (block 614 in FIG. 6), the data offloading processor 402 is configured to copy the memory pages 416 designated as higher priority memory pages 416 in this example from the system memory 408 back to the non-persistent memory 406 in order of their previously determined priority ranking 420 (block 616 in FIG. 6). In this example, the processor-based system 400 prevents another processor(s) from performing memory accesses that would or may access the non-persistent memory 406 until the higher priority memory pages 416 are restored back into the non-persistent memory 406. Then, after the higher priority memory pages 416 are fully restored back into the non-persistent memory 406, the processor-based system 400 allows a processor(s) to perform memory accesses that would or may access the non-persistent memory 406 (block 618 in FIG. 6). The data offloading processor 402 is also configured to copy the remaining, lower priority memory pages 416 from the system memory 408 back into the non-persistent memory 406 based on their previously determined priority ranking 420 (block 620 in FIG. 6). A processor can concurrently access the non-persistent memory 406 when the lower priority memory pages 416 are being restored from the system memory 408 back into the non-persistent memory 406.

A processor-based system that includes a memory system that includes a non-persistent memory and a system memory, such as the processor-based system 100 in FIG. 1 with its non-persistent memory 106 and system memory 108, and wherein the processor-based system also includes a data offloading processor, such as the processors 102(1)-102(2) in FIGS. 1, 2, and 4, configured to generate a priority ranking of data that is offloaded from a non-persistent memory into system memory after exiting the lower power mode, in response to entering a lower power mode for the non-persistent memory, and restore the offloaded data from the system memory back to its non-persistent memory in an order of its priority ranking, including, but not limited to, the processes 300, 600 in FIGS. 3 and 6; and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 7:
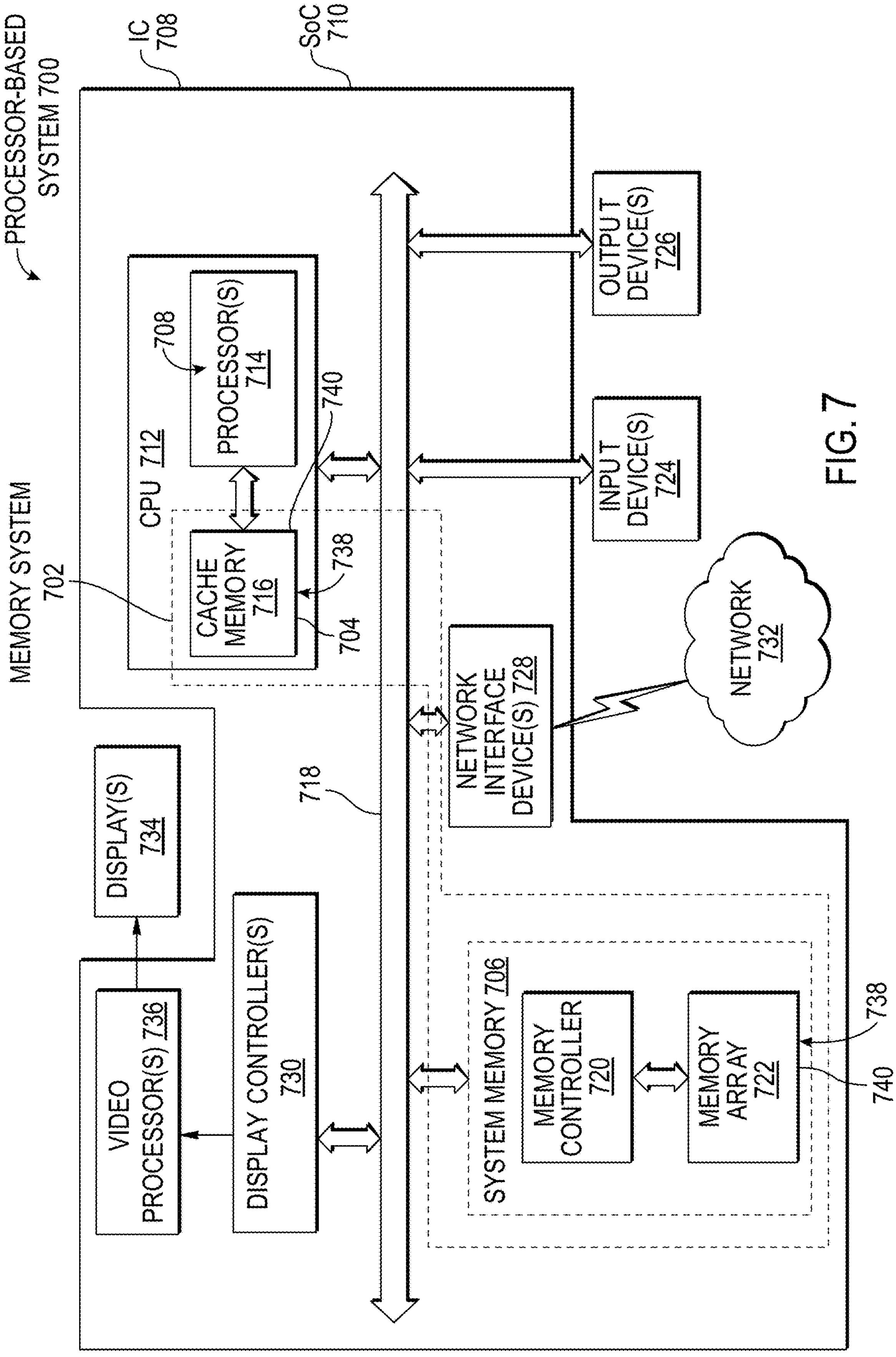
FIG. 7 is a block diagram of an exemplary processor-based system that includes a memory system that includes a non-persistent memory and a system memory, wherein the processor-based system also includes a data offloading processor, such as the data offloading processors in FIGS. 1, 2, and 4, configured to generate a priority ranking of data that is offloaded from a non-persistent memory into system memory after exiting the lower power mode, in response to entering a lower power mode for the non-persistent memory, and restore the offloaded data from the system memory back to its non-persistent memory in an order of its priority ranking, including, but not limited to, the processes in FIGS. 3 and 6.

In this regard, FIG. 7 illustrates an example of a processor-based system 700 that includes a memory system 702 that includes a non-persistent memory 704 and a system memory 706, such as the processor-based system 100 in FIG. 1, and a data offloading processor 708, such as the processors 102(1)-102(2) in FIGS. 1, 2, and 4, configured to generate a priority ranking of data that is offloaded from the non-persistent memory 704 into the system memory 706 (e.g., based on a prediction of access demand of the offloaded data) after exiting the lower power mode, in response to entering a lower power mode for the non-persistent memory 704, and restore the offloaded data from the system memory 706 back to its non-persistent memory 704 in an order of its priority ranking, including, but not limited to, the processes 300, 600 in FIGS. 3 and 6.

In this example, the processor-based system 700 may be formed as an IC 708 and as a system-on-a-chip (SoC) 710. The processor-based system 700 includes a processing unit (PU) 712 that includes one or more processors 714, which can include a central processing unit (CPU), graphics processing unit (GPU), and neural processing unit (NPU). The PU 712 may have a shared cache memory 716, which may be the non-persistent memory 704, and is coupled to the PU 712 for rapid access to temporarily stored data. The processors 714 are coupled to a system bus 718 and can intercouple master and slave devices included in the processor-based system 700. As is well known, the processors 714 communicate with these other devices by exchanging address, control, and data information over the system bus 718. For example, the processors 714 can communicate bus transaction requests to a memory controller 720, as an example of a slave device, to access a memory array 722 as part of the system memory 706. Although not illustrated in FIG. 7, multiple system buses 718 could be provided, wherein each system bus 718 constitutes a different fabric.

As shown in FIG. 7, other master and slave devices can be connected to the system bus 718. As illustrated in FIG. 7, these devices can include the system memory 706 that includes the memory controller 720 and the memory array(s) 722. The processor-based system 700 also includes one or more input devices 724, one or more output devices 726, one or more network interface devices 728, and one or more display controllers 730 as examples. The input device(s) 724 can include any type of input device, including, but not limited to, input keys, switches, voice processors, etc. The output device(s) 726 can include any type of output device, including, but not limited to, audio, video, other visual indicators, etc. The network interface device(s) 728 can be any device configured to allow exchange of data to and from a network 732. The network 732 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 728 can be configured to support any type of communications protocol desired.

The processors 714 may also be configured to access the display controller(s) 730 over the system bus 718 to control information sent to one or more displays 734. The display controller(s) 730 sends information to the display(s) 734 to be displayed via one or more video processors 736, which process the information to be displayed into a format suitable for the display(s) 734. The display controller(s) 730 and video processor(s) 736 can be included in the same or different ICs, or in the same IC 708 containing the PU 712, as examples. The display(s) 734 can include any type of display, including, but not limited to, a cathode ray tube (CRT), a liquid crystal display (LCD), a plasma display, a light emitting diode (LED) display, etc.

The data offloading processor 708 can be configured to execute non-transitory program computer instructions 738 stored in a computer-readable medium 740, such as in the memory array 722 of the system memory 706 and/or the cache memory 716, to perform the tasks of the data offloading processor 708.

Figure 8:
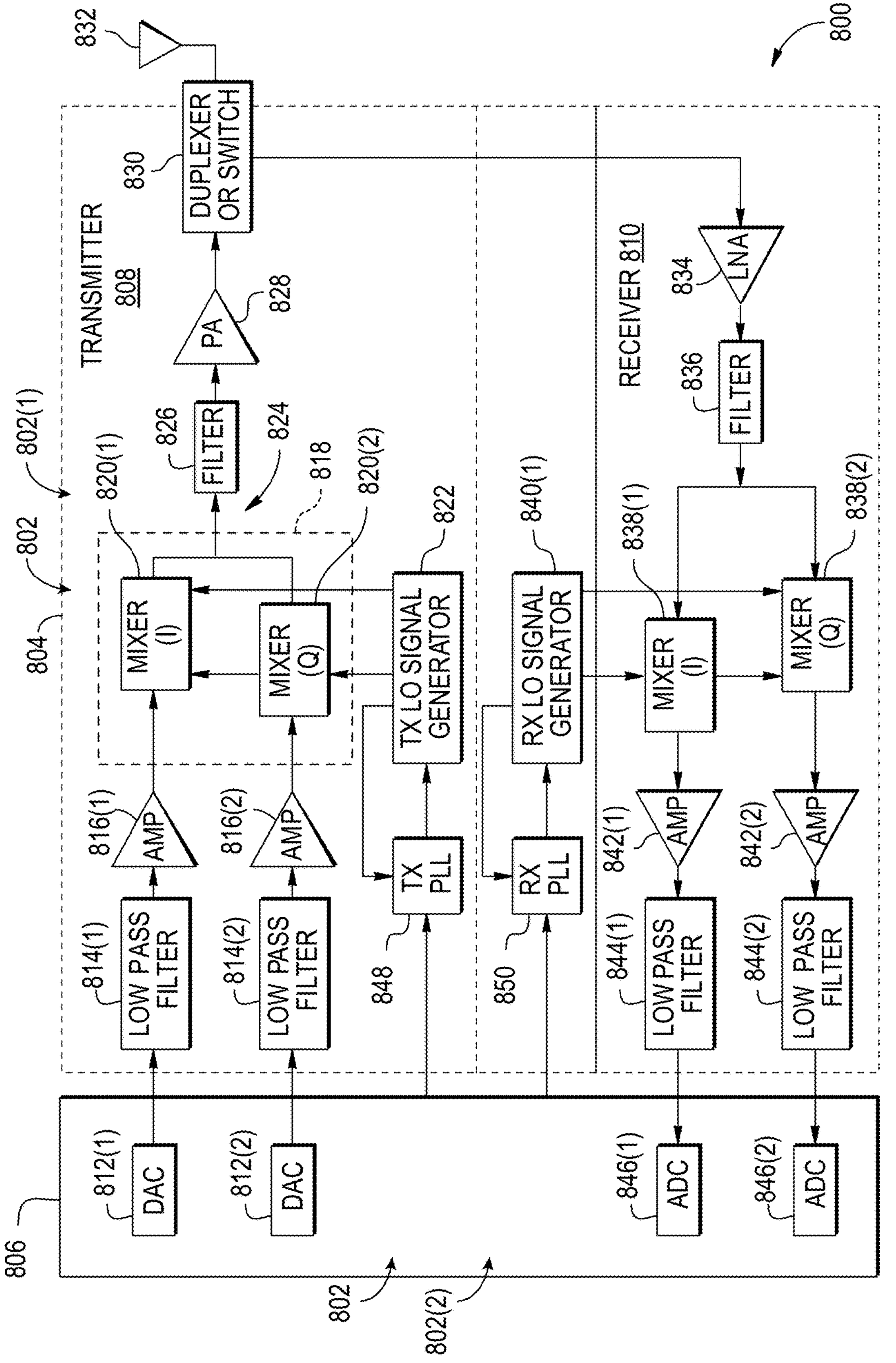
FIG. 8 is a block diagram of an exemplary wireless communications device that includes radio-frequency (RF) components that can include a processor-based system that includes a memory system that includes a non-persistent memory and a system memory, wherein the processor-based system also includes a data offloading processor, such as the data offloading processors in FIGS. 1, 2, and 4, configured to generate a priority ranking of data that is offloaded from a non-persistent memory into system memory after exiting the lower power mode, in response to entering a lower power mode for the non-persistent memory, and restore the offloaded data from the system memory back to its non-persistent memory in a priority order of its priority ranking, including, but not limited to, the processes in FIGS. 3 and 6.

FIG. 8 illustrates an exemplary wireless communications device 800 that includes radio frequency (RF) components and that can include a processor-based system 802, 802(1), 802(2) that includes a memory system that includes a persistent memory and a system memory, such as the processor-based system 100 in FIG. 1, and a data offloading processor, such as the processors 102(1)-102(2) in FIGS. 1, 2, and 4, configured to generate a priority ranking of data that is offloaded from the non-persistent memory into the system memory after exiting the lower power mode, in response to entering a lower power mode for the non-persistent memory, and restore the offloaded data from the system memory back to its non-persistent memory in an order of its priority ranking, including, but not limited to, the processes 300, 600 in FIGS. 3 and 6. The wireless communications device 800 may include or be provided in any of the above-referenced devices, as examples.

As shown in FIG. 8, the wireless communications device 800 includes a transceiver 804 and a data processor 806, each of which may include its processor-based system 802(1), 802(2). The transceiver 804 includes a transmitter 808 and a receiver 810 that support bi-directional communications. In general, the wireless communications device 800 may include any number of transmitters 808 and/or receivers 810 for any number of communication systems and frequency bands. All or a portion of the transceiver 804 may be implemented on one or more analog ICs, RF ICs (RFICs), mixed-signal ICs, etc.

The transmitter 808 or the receiver 810 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 810. In the direct-conversion architecture, a signal is frequency-converted between RF and baseband in one stage. The super-heterodyne and direct-conversion architectures may use different circuit blocks and/or have different requirements. In the wireless communications device 800 in FIG. 8, the transmitter 808 and the receiver 810 are implemented with the direct-conversion architecture.

In the transmit path, the data processor 806 processes data to be transmitted and provides I and Q analog output signals to the transmitter 808. In the exemplary wireless communications device 800, the data processor 806 includes digital-to-analog converters (DACs) 812(1), 812(2) for converting digital signals generated by the data processor 806 into the I and Q analog output signals, e.g., I and Q output currents, for further processing.

Within the transmitter 808, lowpass filters 814(1), 814(2) filter the I and Q analog output signals, respectively, to remove undesired signals caused by the prior digital-to-analog conversion. Amplifiers (AMPs) 816(1), 816(2) amplify the signals from the lowpass filters 814(1), 814(2), respectively, and provide I and Q baseband signals. An upconverter 818 upconverts the I and Q baseband signals with I and Q transmit (TX) local oscillator (LO) signals through mixers 820(1), 820(2) from a TX LO signal generator 822 to provide an upconverted signal 824. A filter 826 filters the upconverted signal 824 to remove undesired signals caused by the frequency up-conversion as well as noise in a receive frequency band. A power amplifier (PA) 828 amplifies the upconverted signal 824 from the filter 826 to obtain the desired output power level and provides a transmit RF signal. The transmit RF signal is routed through a duplexer or switch 830 and transmitted via an antenna 832.

In the receive path, the antenna 832 receives signals transmitted by base stations and provides a received RF signal, which is routed through the duplexer or switch 830 and provided to a low noise amplifier (LNA) 834. The duplexer or switch 830 is designed to operate with a specific receive (RX)-to-TX duplexer frequency separation, such that RX signals are isolated from TX signals. The received RF signal is amplified by the LNA 834 and filtered by a filter 836 to obtain a desired RF input signal. Down-conversion mixers 838(1), 838(2) mix the output of the filter 836 with I and Q RX LO signals (i.e., LO_I and LO_Q) from an RX LO signal generator 840 to generate I and Q baseband signals. The I and Q baseband signals are amplified by AMPs 842(1), 842(2) and further filtered by lowpass filters 844(1), 844(2) to obtain I and Q analog input signals, which are provided to the data processor 806. In this example, the data processor 806 includes analog-to-digital converters (ADCs) 846(1), 846(2) for converting the analog input signals into digital signals to be further processed by the data processor 806.

In the wireless communications device 800 of FIG. 8, the TX LO signal generator 822 generates the I and Q TX LO signals used for frequency up-conversion, while the RX LO signal generator 840 generates the I and Q RX LO signals used for frequency down-conversion. Each LO signal is a periodic signal with a particular fundamental frequency. A TX phase-locked loop (PLL) circuit 848 receives timing information from the data processor 806 and generates a control signal used to adjust the frequency and/or phase of the TX LO signals from the TX LO signal generator 822. Similarly, an RX PLL circuit 850 receives timing information from the data processor 806 and generates a control signal used to adjust the frequency and/or phase of the RX LO signals from the RX LO signal generator 840.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device or processing unit, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based system, comprising:
   - a data offloading processor configured to:
     - in response to entering a lower power mode in the processor-based system:
       - determine a priority ranking of a plurality of designated memory pages identified to be collapsed in the lower power mode in a non-persistent memory; and
       - copy the plurality of designated memory pages into a system memory; and
     - in response to exiting the lower power mode in the processor-based system:
       - copy one or more designated memory pages of the plurality of designated memory pages from the system memory back to the non-persistent memory in order of the determined priority ranking.
2. The processor-based system of clause 1, further comprising a processor configured to, in response to exiting the lower power mode in the processor-based system:
   - perform memory accesses to the non-persistent memory before each of the plurality of designated memory pages is copied from the system memory back to the non-persistent memory.
3. The processor-based system of clause 1 or 2, wherein:
   - the plurality of designated memory pages comprises a higher priority subset of designated memory pages and a lower priority subset of designated memory pages; and
   - the data offloading processor is configured to, in response to exiting the lower power mode in the processor-based system, copy the one or more designated memory pages of the plurality of designated memory pages by being configured to:
     - copy the higher priority subset of designated memory pages from the system memory back to the non-persistent memory in order of the determined priority ranking; and
     - copy the lower priority subset of designated memory pages from the system memory back to the non-persistent memory in order of the determined priority ranking after the higher priority subset of designated memory pages is copied from the system memory back to the non-persistent memory; and
   - further comprising a processor configured to, in response to exiting the lower power mode in the processor-based system:
     - perform memory accesses to the non-persistent memory after the higher priority subset of designated memory pages is copied from the system memory back to the non-persistent memory.
4. The processor-based system of clause 3, wherein the processor is further configured to, in response to exiting the lower power mode in the processor-based system:

perform the memory accesses to the non-persistent memory concurrently with the data offloading processor copying the lower priority subset of designated memory pages from the system memory back to the non-persistent memory.

5. The processor-based system of any of clauses 1-4 configured to collapse the plurality of designated memory pages in response to entering the lower power mode.

6. The processor-based system of clause 5, wherein the data offloading processor is configured to, in response to entering the lower power mode in the processor-based system and before the collapse of the plurality of designated memory pages:

determine the priority ranking of the plurality of designated memory pages and copy the plurality of designated memory pages into the system memory.

7. The processor-based system of any of clauses 1-6, wherein the data offloading processor is further configured to:

in response to entering the lower power mode:

store the determined priority ranking of the plurality of designated memory pages in the system memory; and in response to exiting the lower power mode:

retrieve the determined priority ranking of the plurality of designated memory pages from the system memory.

8. The processor-based system of any of clauses 1-4, 6, and 7 configured to not collapse the system memory in the lower power mode.

9. The processor-based system of any of clauses 1-8, wherein:

the data offloading processor is further configured to, in response to entering the lower power mode in the processor-based system:

predict access demand of the plurality of designated memory pages to be collapsed in the lower power mode in the non-persistent memory, after exiting the lower power mode; and the data offloading processor is configured to determine the priority ranking of the plurality of designated memory pages based on the access demand prediction.

10. The processor-based system of clause 9, wherein the data offloading processor is configured to predict the access demand of the plurality of designated memory pages by being configured to:

predict the access demand of each designated memory page of the plurality of designated memory pages relative to the other designated memory pages of the plurality of designated memory pages to be collapsed in the lower power mode in the non-persistent memory.

11. The processor-based system of clause 10, wherein the data offloading processor is further configured to predict the access demand of each designated memory page based on at least one access demand attribute for each designated memory page indicative of when the designated memory page may be first accessed after exiting the lower power mode.

12. The processor-based system of clause 11, wherein the at least one access demand attribute of each designated memory page is comprised from the group consisting of frequency of access of the designated memory page, frequency of access of the designated memory page after exiting the lower power mode, eviction rate of the designated memory page, retention time of the designated memory page until eviction, page misses on the designated memory page, and the designated memory page being recently used before entering the lower power mode.

13. The processor-based system of any of clauses 9-12, wherein the data offloading processor is configured to determine the priority ranking of the plurality of designated memory pages based on a regression prediction model for the access demand prediction of the plurality of designated memory pages.

14. The processor-based system of any of clauses 1-13, wherein the data offloading processor is configured to, in response to exiting the lower power mode in the processor-based system:

restore the plurality of designated memory pages in the non-persistent memory in order of the determined priority ranking back to their original location in the non-persistent memory prior to entering the lower power mode.

15. The processor-based system of any of clauses 1-14, wherein:

the non-persistent memory comprises a plurality of memory banks each comprising a plurality of memory pages; and the data offloading processor is configured to:

in response to entering the lower power mode in the processor-based system:

determine the priority ranking of the plurality of designated memory pages in one or more designated memory banks of the plurality of memory banks to be collapsed in the lower power mode in the non-persistent memory; and in response to exiting the lower power mode in the processor-based system:

restore the plurality of memory pages in the one or more designated memory banks in order of the determined priority ranking.

16. The processor-based system of any of clauses 1-15, wherein the data offloading processor is further configured to, in response to exiting the lower power mode in the processor-based system:

determine if one or more other memory pages outside of the plurality of designated memory pages from the system memory have a higher priority ranking than the determined priority ranking of the plurality of designated memory pages; and copy the one or more other memory pages determined to have a higher priority ranking than the determined priority ranking of any of the plurality of designated memory pages memory pages to the non-persistent memory.

17. The processor-based system of any of clauses 1-16 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

18. A method of restoring offloaded data from a system memory to a non-persistent memory in a processor-based system in response to entering a lower power mode, comprising:
 in response to entering the lower power mode in the processor-based system:
  determining a priority ranking of a plurality of designated memory pages identified to be collapsed in the lower power mode in the non-persistent memory; and
  copying the plurality of designated memory pages into the system memory; and
 in response to exiting the lower power mode in the processor-based system:
  copying one or more designated memory pages of the plurality of designated memory pages from the system memory back to the non-persistent memory in order of the determined priority ranking.

19. The method of clause 18, further comprising, in response to exiting the lower power mode in the processor-based system:
 performing memory accesses to the non-persistent memory before each of the plurality of designated memory pages is copied from the system memory back to the non-persistent memory.

20. The method of clause 18 or 19, wherein in response to exiting the lower power mode in the processor-based system:
 further comprising predicting access demand of the plurality of designated memory pages to be collapsed in the lower power mode in the non-persistent memory, after exiting the lower power mode; and
 wherein determining the priority ranking of the plurality of designated memory pages comprises determining the priority ranking of the plurality of designated memory pages based on the access demand prediction.

21. The method of clause 20, wherein predicting the access demand of the plurality of designated memory pages comprises:
 predicting the access demand of each designated memory page of the plurality of designated memory pages relative to the other designated memory pages of the plurality of designated memory pages to be collapsed in the lower power mode in the non-persistent memory.

What is claimed is:

1. A processor-based system, comprising:
a data offloading processor configured to:
 in response to entering a lower power mode in the processor-based system:
  predict access demand of a plurality of designated memory pages to be collapsed in the lower power mode in a non-persistent memory;
  determine a priority ranking of the plurality of designated memory pages identified to be collapsed in the lower power mode in the non-persistent memory based on the access demand prediction; and
  copy the plurality of designated memory pages into a system memory; and
 in response to exiting the lower power mode in the processor-based system:
  copy one or more designated memory pages of the plurality of designated memory pages from the system memory back to the non-persistent memory in order of the determined priority ranking.

2. The processor-based system of claim 1, further comprising a processor configured to, in response to exiting the lower power mode in the processor-based system:
 perform memory accesses to the non-persistent memory before each of the plurality of designated memory pages is copied from the system memory back to the non-persistent memory.

3. The processor-based system of claim 1, wherein:
 the plurality of designated memory pages comprises a higher priority subset of designated memory pages and a lower priority subset of designated memory pages; and
 the data offloading processor is configured to, in response to exiting the lower power mode in the processor-based system, copy the one or more designated memory pages of the plurality of designated memory pages by being configured to:
  copy the higher priority subset of designated memory pages from the system memory back to the non-persistent memory in order of the determined priority ranking; and
  copy the lower priority subset of designated memory pages from the system memory back to the non-persistent memory in order of the determined priority ranking after the higher priority subset of designated memory pages is copied from the system memory back to the non-persistent memory; and
 further comprising a processor configured to, in response to exiting the lower power mode in the processor-based system:
  perform memory accesses to the non-persistent memory after the higher priority subset of designated memory pages is copied from the system memory back to the non-persistent memory.

4. The processor-based system of claim 3, wherein the processor is further configured to, in response to exiting the lower power mode in the processor-based system:
 perform the memory accesses to the non-persistent memory concurrently with the data offloading processor copying the lower priority subset of designated memory pages from the system memory back to the non-persistent memory.

5. The processor-based system of claim 1 configured to collapse the plurality of designated memory pages in response to entering the lower power mode.

6. The processor-based system of claim 5, wherein the data offloading processor is configured to, in response to entering the lower power mode in the processor-based system and before the collapse of the plurality of designated memory pages:
 determine the priority ranking of the plurality of designated memory pages and copy the plurality of designated memory pages into the system memory.

7. The processor-based system of claim 1, wherein the data offloading processor is further configured to:
 in response to entering the lower power mode:
  store the determined priority ranking of the plurality of designated memory pages in the system memory; and
 in response to exiting the lower power mode:

retrieve the determined priority ranking of the plurality of designated memory pages from the system memory.

8. The processor-based system of claim 1 configured to not collapse the system memory in the lower power mode.

9. The processor-based system of claim 1, wherein the data offloading processor is configured to predict the access demand of the plurality of designated memory pages by being configured to:

predict the access demand of each designated memory page of the plurality of designated memory pages relative to the other designated memory pages of the plurality of designated memory pages to be collapsed in the lower power mode in the non-persistent memory.

10. The processor-based system of claim 9, wherein the data offloading processor is further configured to predict the access demand of each designated memory page based on at least one access demand attribute for each designated memory page indicative of when the designated memory page may be first accessed after exiting the lower power mode.

11. The processor-based system of claim 10, wherein the at least one access demand attribute of each designated memory page is comprised from the group consisting of frequency of access of the designated memory page, frequency of access of the designated memory page after exiting the lower power mode, eviction rate of the designated memory page, retention time of the designated memory page until eviction, page misses on the designated memory page, and the designated memory page being recently used before entering the lower power mode.

12. The processor-based system of claim 1, wherein the data offloading processor is configured to determine the priority ranking of the plurality of designated memory pages based on a regression prediction model for the access demand prediction of the plurality of designated memory pages.

13. The processor-based system of claim 1, wherein the data offloading processor is configured to, in response to exiting the lower power mode in the processor-based system:

restore the plurality of designated memory pages in the non-persistent memory in order of the determined priority ranking back to their original location in the non-persistent memory prior to entering the lower power mode.

14. The processor-based system of claim 1, wherein:

the non-persistent memory comprises a plurality of memory banks each comprising a plurality of memory pages; and the data offloading processor is configured to:

in response to entering the lower power mode in the processor-based system:

determine the priority ranking of the plurality of designated memory pages in one or more designated memory banks of the plurality of memory banks to be collapsed in the lower power mode in the non-persistent memory; and in response to exiting the lower power mode in the processor-based system:

restore the plurality of memory pages in the one or more designated memory banks in order of the determined priority ranking.

15. The processor-based system of claim 1, wherein the data offloading processor is further configured to, in response to exiting the lower power mode in the processor-based system:

determine if one or more other memory pages outside of the plurality of designated memory pages from the system memory have a higher priority ranking than the determined priority ranking of the plurality of designated memory pages; and copy the one or more other memory pages determined to have a higher priority ranking than the determined priority ranking of any of the plurality of designated memory pages memory pages to the non-persistent memory.

16. The processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

17. A method of restoring offloaded data from a system memory to a non-persistent memory in a processor-based system in response to entering a lower power mode, comprising:

in response to entering the lower power mode in the processor-based system:

predicting access demand of a plurality of designated memory pages to be collapsed in the lower power mode in the non-persistent memory;

determining a priority ranking of the plurality of designated memory pages identified to be collapsed in the lower power mode in the non-persistent memory based on the access demand prediction; and copying the plurality of designated memory pages into the system memory; and in response to exiting the lower power mode in the processor-based system:

copying one or more designated memory pages of the plurality of designated memory pages from the system memory back to the non-persistent memory in order of the determined priority ranking.

18. The method of claim 17, further comprising, in response to exiting the lower power mode in the processor-based system:

performing memory accesses to the non-persistent memory before each of the plurality of designated memory pages is copied from the system memory back to the non-persistent memory.

19. The method of claim 17, wherein predicting the access demand of the plurality of designated memory pages comprises:

predicting the access demand of each designated memory page of the plurality of designated memory pages relative to the other designated memory pages of the plurality of designated memory pages to be collapsed in the lower power mode in the non-persistent memory.

* * * * *